United States Patent [19]
Minks et al.

[11] Patent Number: 6,093,341
[45] Date of Patent: Jul. 25, 2000

[54] HEAT TRANSFER MEDIUM BASED ON ALKYLENE GLYCOLS FOR SOLAR UNITS

[75] Inventors: Peter Minks, Altötting; Johann Schuster, Kastl; Knud Pulletz, Winhöring, all of Germany

[73] Assignee: Clariant GmbH, Frankfurt, Germany

[21] Appl. No.: 09/338,967

[22] Filed: Jun. 24, 1999

[30] Foreign Application Priority Data

Jul. 8, 1998 [DE] Germany .................. 198 30 493

[51] Int. Cl.⁷ ...................................... C09K 5/00
[52] U.S. Cl. ................ 252/70; 252/71; 252/73; 252/74; 252/75; 252/76; 252/77
[58] Field of Search ................. 252/70, 71, 73, 252/74, 75, 76, 77

[56] References Cited

U.S. PATENT DOCUMENTS

| | | | |
|---|---|---|---|
| 4,389,371 | 6/1983 | Wilson et al. | 422/15 |
| 4,452,758 | 6/1984 | Wilson et al. | 422/15 |
| 4,455,248 | 6/1984 | Wood | 252/75 |
| 4,758,367 | 7/1988 | George | 252/75 |
| 5,484,547 | 1/1996 | Mendoza | 252/73 |

*Primary Examiner*—Anthony Green
*Attorney, Agent, or Firm*—Miles B. Dearth; Scott E. Hanf

[57] ABSTRACT

The invention relates to a concentrate for a heat transfer medium for solar units, comprising a) from 45 to 98% by weight of triethylene glycol and/or tetraethylene glycol, b) from 1 to 55% by weight of 1,2-propylene glycol and/or ethylene glycol, and c) from 1 to 6% by weight of corrosion inhibitors.

The concentrate is used in admixture with water for heat transport in solar units.

9 Claims, No Drawings

HEAT TRANSFER MEDIUM BASED ON ALKYLENE GLYCOLS FOR SOLAR UNITS

BACKGROUND OF THE INVENTION

Solar systems are units which generally comprise a solar absorber for the absorption of solar heat and, by means of a heat transfer medium, convey the absorbed heat from the solar absorber to the heat exchanger of a hot water system. Vacuum tube collectors are increasingly being used for the effective exploitation of solar energy. The good thermal insulation makes it possible to achieve not only a high efficiency but also a very high no-load temperature which can be up to +260° C. when the unit is shut down and no heat is being taken off. Heat transfer media used are customarily glycols such as ethylene glycol but preferably the nontoxic 1,2-propylene glycol together with appropriate corrosion inhibitors.

Temperatures above +220° C. result, even under pressure (customarily 2–4 bar), in vaporization of the water and later the glycols when the units are in a no-load condition. This can result in crystallization of the corrosion inhibitors. The salt-like slurry formed with the residues of glycol can deposit, in particular, in the thin tubes of the vacuum collectors and lead to the tubes becoming blocked by decomposition products. These deposits can be so tenacious that they no longer dissolve in fresh solar fluid, nor even in water. The consequence can be failure of the unit, which leads to expensive replacement of the tubes concerned.

This problem has already been recognized in DE-A-195 25 090 and attempts have been made to solve it. An addition of 10–40%, preferably 15–25%, of a relatively high molecular weight polyalkylene glycol having a molar mass in the range 195–400 was proposed, the remainder being 1,2-propylene glycol, ethylene glycol or a mixture of these two compounds. This basic mix is mixed with water in a ratio of 40–70% by weight in order to achieve the necessary antifreeze and heat transfer properties.

However, it has been found that the heat transfer media of the prior art do not provide a satisfactory solution to the problem of overheating of solar units. Decomposition of the constituents still occurs, with the consequences described above.

It is an object of the invention to find a heat transfer medium whose tendency to boil and decompose is lower still than the heat transfer media of the prior art.

SUMMARY OF THE INVENTION

It has surprisingly been found that low molecular weight alkylene glycols are eminently suitable as heat transfer media.

The invention provides a concentrate for a heat transfer medium for solar units, which concentrate comprises
  a) from 45 to 98% by weight of triethylene glycol and/or tetraethylene glycol,
  b) from 1 to 55% by weight of 1,2-propylene glycol and/or ethylene glycol, and
  c) from 1 to 6% by weight of corrosion inhibitors.

DESCRIPTION OF THE PREFERRED EMBODIMENTS

The proportion of triethylene glycol and/or tetraethylene glycol is preferably from 50 to 95% by weight, in particular from 60 to 90% by weight. In a further, preferred embodiment, mixtures of triethylene glycol and tetraethylene glycol in a mixing ratio of preferably from 3:1 to 1:3 are used.

The proportion of 1,2-propylene glycol and/or ethylene glycol is preferably from 10 to 45% by weight, in particular from 15 to 30% by weight. In a further, preferred embodiment, mixtures of these compounds are used here too.

This base mixture with corrosion inhibitors can be used to produce the ready-to-use heat transfer medium by mixing with from 30 to 60% by weight, preferably from 45 to 55% by weight, of water, based on the weight of the water-containing mixture. Alternatively, the mixture with water can comprise from 30% to 70% by weight, preferably, from 40% to 60% by weight of the concentrate, with water to 100% by weight. A particularly preferred embodiment of the invention provides mixtures comprising the following components:
  a) from 25 to 30% by weight of triethylene glycol and/or tetraethylene glycol,
  b) from 20 to 25% by weight of 1,2-propylene glycol,
  c) from 1 to 1.5% by weight of corrosion inhibitors, and
  d) from 45 to 55% by weight of water.

For reasons of corrosion protection, corrosion inhibitors such as borates, silicates, monocarboxylic and dicarboxylic acids, sodium benzoate, benzotriazole or tolyltriazole, sodium nitrite, potassium nitrite, sodium nitrate, potassium nitrate and further inhibitors known from the literature are used in the heat transfer medium. The corrosion inhibitor content is preferably from 2 to 4% by weight, based on the water-free base mixture.

Further details of the present invention may be found in the following examples.

EXAMPLE 1

The ready-to-use heat transfer medium according to the invention consists of the following components:
  a) 20.0% by weight of 1,2-propylene glycol
  b) 25.0% by weight of triethylene glycol
  c) 1.4% by weight of corrosion inhibitors
  d) balance to 100%: deionized water The ready-to-use heat transfer medium has the following properties:

Pour point: −33° C.,

Viscosity at 20° C.: 7.5 mm$^2$/sec.

The liquid was tested for temperature behavior in a distillation test. For this purpose, 400 g of the heat transfer medium were placed in a round-bottom flask and distilled to dryness by means of a heating bath (temperature=+260° C.). The residue was left at this temperature for 48 hours and, after cooling, was assessed as follows:

- Appearance: dark, slightly turbid liquid
- Amount of residue: 108 g (27% by weight)
- Viscosity: 142 mm$^2$/s
- Solubility in the glycol/water mixture: soluble, with slight turbidity

COMPARATIVE EXAMPLE 1a

A commercial solar heat transfer medium based on 1,2-propylene glycol, consisting of:
  a) 47.5% by weight of 1,2-propylene glycol
  b) 2.5% by weight of corrosion inhibitors
  c) 50.0% by weight of deionized water
and having the following properties:

Pour point: −39° C.,

Viscosity: 7.0 mm$^2$/s was subjected to thermal stress as in Example 1, giving the following result:

| | |
|---|---|
| • Appearance | black solid |
| • Amount of residue | 17 g (4.3% by weight) |
| • Viscosity at 20° C. | solid |
| • Solubility in the glycol/water mixture | partial, with a great deal of Turbidity |

EXAMPLE 2

Composition of the heat transfer medium according to the invention:

a) 35.0% of triethylene glycol, technical-grade
b) 15.0% of 1,2-propylene glycol
c) 1.5% by weight of corrosion inhibitors
d) balance to 100% by weight: deionized water Properties:
Pour point: −30° C.,
Viscosity: 7.2 mm$^2$/s at 20° C.

This heat transfer medium was subjected to thermal stress as in Example 1 and was then evaluated as follows:

| | |
|---|---|
| • Appearance | dark liquid |
| • Amount of residue | 184.8 g (46.2% by weight) |
| • Viscosity at 20° C. | 183 mm$^2$/s |
| • Solubility in the glycol/water mixture | soluble, with turbidity |

COMPARATIVE EXAMPLE 2a

Use was made of a heat transfer medium in accordance with DE-A-195 25 090 consisting of:

a) 37.5% by weight of 1,2-propylene glycol
b) 10.0% by weight of PEG 200 (polyethylene glycol 200)
c) 1.75% by weight of corrosion inhibitors
d) balance to 100% by weight: deionized water Properties:
Pour point: −35° C.
Viscosity at 20° C.: 6.5 mm$^2$/s Result after being subjected to thermal stress as in Example 1:

| | |
|---|---|
| • Appearance<br>Amount of residue | black, viscous coating<br>33.1 g (8.3% by weight) |
| • Viscosity at 20° C. | not measurable (>1000 mm$^2$/s) |
| • Solubility in the glycol/water mixture | partially soluble with black, viscous residue |

EXAMPLE 3

Composition of the heat transfer medium according to the invention:

a) 20% by weight of ethylene glycol (ethanediol)
b) 10% by weight of triethylene glycol
c) 20% by weight of tetraethylene glycol
d) 3% of corrosion inhibitors
e) balance to 100% by weight: deionized water Properties:
Pour point: −31° C.,
Viscosity at 20° C.: 6.3 mm$^2$/s Thermal stress as in Example 1 gives the following result:

| | |
|---|---|
| • Appearance | dark liquid |
| • Amount of residue | 180 g (45.0% by weight) |
| • Viscosity at 20° C. | 118 mm$^2$/s |
| • Solubility in the glycol/water mixture | soluble with slight turbidity |

COMPARATIVE EXAMPLE 3a

Use was made of a commercial heat transfer medium based on ethylene glycol and having the following composition:

a) 45.0% of ethylene glycol
b) 3% of corrosion inhibitors
c) 47% by weight of deionized water Properties:
Pour point: −42° C.
viscosity at 20° C.: 4.1 mm$^2$/s Result after being subjected to thermal stress as described in Example 1:

| | |
|---|---|
| • Appearance | black, solid residue |
| • Amount of residue | 32 g (8.0% by weight) |
| • Viscosity at 20° C. | solid |
| • Solubility in the glycol/water mixture | soluble to give a turbid solution |

What is claimed is:

1. A concentrate for a heat transfer medium for solar units, comprising from 45 to 98% by weight of a glycol selected from the group consisting of triethylene glycol, tetraethylene glycol and mixtures thereof, from 10 to 45% by weight of at least one other glycol selected from the group consisting of 1,2-propylene glycol, ethylene glycol and mixtures thereof, and from 1 to 6% by weight of corrosion inhibitors.

2. A concentrate as claimed in claim 1 in which borates, silicates, monocarboxylic or dicarboxylic acids, sodium benzoate, benzotriazoles, tolyltriazoles, nitrites or nitrates are present as corrosion inhibitors.

3. A concentrate as claimed in claim 1, wherein the corrosion inhibitor content is from 2 to 4% by weight.

4. A concentrate as claimed claim 1, wherein the content of triethylene glycol, tetraethylene glycol or a mixture thereof is from 50 to 95% by weight.

5. A concentrate as claimed in claim 1, wherein the content of 1,2-propylene glycol, ethylene glycol or said mixture thereof is from 15 to 30% by weight.

6. A mixture comprising the concentrate as claimed in claim 1 and water wherein the concentrate constitutes from 30 to 70% by weight of the mixture.

7. A mixture as claimed in claim 6 wherein said mixture comprises
a) from 25 to 30% by weight of a glycol selected from the group consisting of triethylene glycol, tetraethylene glycol and mixtures thereof,
b) from 20 to 25% by weight of 1,2-propylene glycol,
c) from 1 to 1.5% by weight of corrosion inhibitors, and
d) from 45 to 55% by weight of water.

8. A concentrate as claimed in claim 4, wherein the content of triethylene glycol, tetraethylene glycol or a mixture thereof is from 60 to 90% by weight.

9. The mixture as claimed in claim 6 and water, wherein the concentrate constitutes from 40 to 60% by weight of the mixture.

* * * * *